(12) United States Patent
Nicholson et al.

(10) Patent No.: US 12,080,204 B2
(45) Date of Patent: Sep. 3, 2024

(54) VARIABLE BRIGHTNESS AND FIELD OF VIEW DISPLAY

(71) Applicant: GOOGLE LLC, Mountain View, CA (US)

(72) Inventors: Stuart James Myron Nicholson, Waterloo (CA); Timothy Paul Bodiya, Toronto (CA); Daniel Adema, Kitchener (CA); Shreyas Potnis, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/913,043

(22) PCT Filed: Dec. 14, 2020

(86) PCT No.: PCT/US2020/064830
§ 371 (c)(1),
(2) Date: Sep. 20, 2022

(87) PCT Pub. No.: WO2022/132124
PCT Pub. Date: Jun. 23, 2022

(65) Prior Publication Data
US 2023/0215304 A1    Jul. 6, 2023

(51) Int. Cl.
*G09G 3/00*      (2006.01)
*G02B 27/01*     (2006.01)
(Continued)

(52) U.S. Cl.
CPC .............. *G09G 3/002* (2013.01); *G02B 27/01* (2013.01); *G02B 27/017* (2013.01);
(Continued)

(58) Field of Classification Search
CPC .............. G09G 3/002; G09G 2320/043; G09G 2320/0626; G09G 2320/066;
(Continued)

(56) References Cited

U.S. PATENT DOCUMENTS

| 2007/0115435 A1 | 5/2007 | Rosendaal |
| 2007/0146356 A1 | 6/2007 | Ladouceur |

(Continued)

FOREIGN PATENT DOCUMENTS

| JP | 2008089934 A | 4/2008 |
| JP | 2013109183 A | 6/2013 |

(Continued)

OTHER PUBLICATIONS

International Search Report and Written Opinion mailed Jul. 2, 2021 for corresponding International Application No. PCT/US2020/054830, 16 pages.

(Continued)

*Primary Examiner* — Adam R. Giesy (57) ABSTRACT

A display system varies a size of a field of view area of a display for augmented reality (AR) applications based on at least one of ambient light in the environment and content displayed at the display and varying a brightness level of the field of view area such that the brightness level within the field of view area is inversely proportional to the field of view area. Based on an amount of ambient light detected in the environment of the display system, the display system adjusts the size of the area of the field of view of the display in inverse proportion to the amount of detected ambient light. As the size of the field of view area decreases, the display system increases the brightness level of the display within the field of view such that the brightness level is approximately inversely proportional to the field of view area.

20 Claims, 8 Drawing Sheets

(51) Int. Cl.
  *G02B 27/02* (2006.01)
  *G02B 27/09* (2006.01)
  *G02B 27/10* (2006.01)

(52) U.S. Cl.
  CPC ........ *G02B 27/0179* (2013.01); *G02B 27/026* (2013.01); *G02B 27/0988* (2013.01); *G02B 27/1066* (2013.01); *G09G 2320/043* (2013.01); *G09G 2320/0626* (2013.01); *G09G 2320/066* (2013.01); *G09G 2330/021* (2013.01); *G09G 2330/045* (2013.01); *G09G 2340/0464* (2013.01); *G09G 2360/144* (2013.01)

(58) Field of Classification Search
  CPC ....... G09G 2330/021; G09G 2330/045; G09G 2340/0464; G09G 2360/144; G02B 27/01; G02B 27/017; G02B 27/0179; G02B 27/026; G02B 27/0988; G02B 27/1066
  See application file for complete search history.

(56) References Cited

U.S. PATENT DOCUMENTS

| | | | |
|---|---|---|---|
| 2008/0235749 A1* | 9/2008 | Jain | H04N 21/6581 725/38 |
| 2017/0070714 A1 | 3/2017 | Honkanen et al. | |
| 2017/0229099 A1 | 8/2017 | Mito | |
| 2017/0316757 A1* | 11/2017 | Whang | G09G 5/10 |
| 2018/0004286 A1* | 1/2018 | Chen | G06F 3/0481 |
| 2018/0364488 A1* | 12/2018 | Mori | G02B 27/0172 |
| 2019/0286231 A1 | 9/2019 | Burns et al. | |
| 2019/0356903 A1 | 11/2019 | Uhm et al. | |
| 2020/0133006 A1 | 4/2020 | Eash et al. | |

FOREIGN PATENT DOCUMENTS

| | | |
|---|---|---|
| JP | 2016009056 A | 1/2016 |
| JP | 2017149335 A | 8/2017 |
| JP | 2019066562 A | 4/2019 |
| WO | 2017189699 A1 | 11/2017 |

OTHER PUBLICATIONS

Translation of Korean Office Action mailed Jun. 29, 2023 for Korean Application No. 10-2022-7034242, 16 pages.
International Preliminary Report on Patentability mailed Jun. 29, 2023 for PCT Application No. PCT/US2020/064830, 11 pages.
Translation of JP Notice of Grounds of Rejection mailed Nov. 14, 2023 for JP Application No. 2022-565681, 10 pages.
Translation of Korean Office Action mailed Jan. 3, 2024 for KR Patent Application No. 1020227034242, 5 pages.
Translation of JP Notice of Grounds of Rejection mailed Apr. 16, 2024 for JP Application No. 2022-565681, 7 pages.
Translation of Notice of Allowance mailed Apr. 25, 2024 for KR Application No. 10-2022-7034242, 4 pages.

* cited by examiner

VARIABLE BRIGHTNESS AND FIELD OF VIEW DISPLAY

CROSS-REFERENCE TO RELATED APPLICATION

The present application is a U.S. National Stage under 35 U.S.C. § 371 of International Patent Application Serial No. PCT/US2020/064830, entitled "VARIABLE BRIGHTNESS AND FIELD OF VIEW DISPLAY" and filed on Dec. 14, 2020, the entirety of which is incorporated by reference herein.

BACKGROUND

Display systems for augmented reality (AR) applications compete with ambient light in the environment to maintain a contrast level that is sufficient for easy understanding of displayed information by a user. Ambient environment brightness covers a wide range of up to 100,000 lux in bright sunlight, creating challenges for the display systems to provide a brightness level that supports sufficient contrast for a satisfying user experience. For example, in some cases a brightness level of 5000-8000 nits (candelas per square meter) may be needed for a display to provide a contrast ratio of 3:1 to minimize cognitive load for perceiving the display. However, maintaining a high brightness level over a wide field of view display increases power consumption and may exceed local thermal or power constraints or cause failures or reduce lifetime of display system elements in the event of operation beyond their rated brightness.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Field of view generally refers to the extent that a scene is visible to an observer and is usually characterized by the angle formed at the eye between respective light beams originating from two points at opposite edges of a scene that are both visible from the same eye position. The human eye typically has a field of view of almost 180° across the horizontal direction and about 135° across the vertical direction. A near eye display system typically has a field of view that is less than the field of view of the eye. In general, a near eye display system implementing a larger field of view has overall higher power consumption because, at least in part, of increased light signal generation necessary to fill the larger field of view.

FIGS. 1-8 illustrate techniques for varying (e.g., controlling) a size of a field of view area of a display system for augmented reality (AR) applications based on at least one of ambient light in the environment and content displayed at the display and for varying (e.g., controlling) a brightness level of the field of view area such that the brightness level within the field of view area is inversely proportional to the field of view area. In some embodiments, the display system is a near eye display system that includes an ambient light sensor and a display. The ambient light sensor detects an amount of ambient light in the environment of the display system. Based on the amount of detected ambient light, the display system varies the size of the area of a field of view of the display in inverse proportion to the amount of detected ambient light. For example, if the amount of ambient light is relatively high, the display system reduces the area of the field of view. By varying the field of view based on the amount of detected ambient light, the display system increases contrast (i.e., the ratio of display brightness to ambient brightness) without increasing power consumption.

As the display system reduces the area of the field of view, the display system also increases the brightness level of the display within the field of view such that the brightness level is approximately inversely proportional to the field of view area. The display system uses a scanning projection system in some embodiments, wherein the display brightness at a given portion of the display is a function of the amount of time spent at the portion. As the total field of view area swept by the projector shrinks, the time spent at any given point within the field of view area increases, thus increasing the apparent display brightness. In some embodiments, the time spent at any given point increases due to either extended dwell time (i.e., a slower scan), or more instances within a fixed time (i.e., an increased number of scans across a specific point or angle).

In some embodiments, the display system varies the location or size of the field of view area of the display based on the content being displayed. For example, in some embodiments, the display system displays a notification of an incoming message at a location on the display that is likely to capture the user's attention without blocking the user's view of other visual information that is important for the user's experience.

Figure 1:
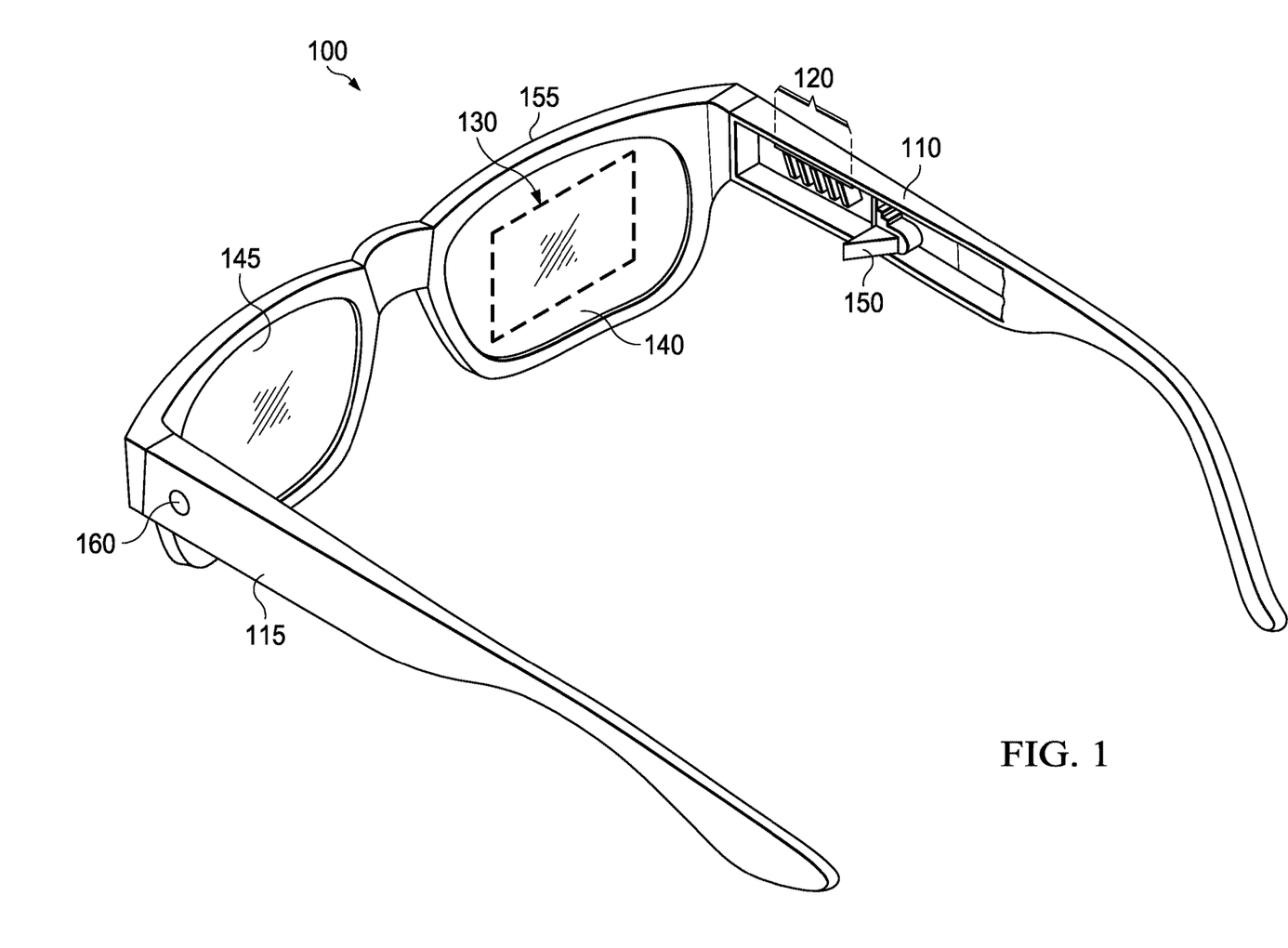
FIG. 1 is a perspective view of a display system with a projector to vary a field of view area of the display in inverse proportion to a brightness level of the display in accordance with some embodiments.

FIG. 1 illustrates a display system 100 with a projector 120 configured to adjust a scan size and field of view area 130 of a display at one or both of lens elements 140, 145 in inverse proportion to a brightness level of the display in accordance with some embodiments. In the illustrated example, display system 100 includes a support structure 110 that in use is worn on the head of a user and has a general shape and appearance of an eyeglasses (e.g., sunglasses) frame. Support structure 110 carries components including the projector 120, a controller 150, a forward-facing camera 155, and an ambient light sensor 160 that detects a level of ambient light in the environment of the display system 100. In some embodiments, portions of the projector 120 and controller 150 are contained within an inner volume of support structure 110; however, FIG. 1 provides a partial-cutaway view in which regions of the support structure 110 have been removed in order to render visible portions of the projector 120 and controller 150 that would otherwise be concealed. Components of the display system 100 are implemented as hardware, firmware, software, or any combination thereof. In some embodiments, the display system 100 has a different shape and appearance from the eyeglasses frame depicted in FIG. 1. Further, in some embodiments the display system 100 includes one or more software, hardware, and firmware components in addition to or different from those shown in FIG. 1.

The forward-facing camera 155 captures image data of the local environment of the display system 100. In some embodiments, the display system 100 includes one or more additional forward-facing cameras (not shown) having fields of view that overlap starting at a specified distance from the display system 100, thereby enabling depth sensing of objects in the local environment that are positioned in the region of overlapping field of view via image analysis.

The display system 100 includes lens elements 140, 145 one or both of which include a material to direct an image or graphic to the user's eye. In addition, each of the lens elements 140, 145 is sufficiently transparent to allow a user to see through to provide a field of view of the user's real-world environment. In some embodiments, the lens elements 140, 145 act as a combiner in a light projection system and include a coating that reflects the light projected onto them from the projector 120. In embodiments in which the projector 120 is a scanning laser projector, a reflective coating may not be used.

In some embodiments, the lens elements 140, 145 include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver (not shown) is disposed within the support structures 110, 115 for driving such a matrix display. The lens element 140 provide an augmented reality display in which a virtual representation can be superimposed over or provided in conjunction with a real-world view as perceived by the user through the lens element 140. In the depicted embodiment, the visual representation is a projected image projected by the projector 120 onto an inside surface of the lens element 140. In some embodiments, a second projector (not shown) is contained within an inner volume of the support structure 115 and projects light onto an inside surface of the other lens element 145.

In some embodiments, the projector 120 is a digital light processing-based projector, a scanning laser projector, or any combination of a modulative light source such as a laser or one or more LEDs and a dynamic reflector mechanism such as one or more dynamic scanners or digital light processors. In some embodiments, the projector 120 includes multiple laser diodes (e.g., a red laser diode, a green laser diode, and/or a blue laser diode) and at least one scan mirror (e.g., a single two-dimensional scan mirror or two one-dimensional scan mirrors, which may be, e.g., micro-electromechanical system (MEMS)-based or piezo-based). The projector 120 is communicatively coupled to (and support structures 110, 115 may further carry) the controller 150 and a non-transitory processor-readable storage medium or memory storing processor-executable data and/or instructions that, when executed by the controller 150, cause the controller 150 to control the operation of the projector 120.

The controller 150 controls a scan area size and scan area location for the projector 120 and is communicatively coupled to the ambient light sensor 160 and to a processor (not shown) that generates content to be displayed at the display system 100. The projector 120 projects light over a variable area called the field of view of the display system 100. The scan area size corresponds to the size of the field of view area and the scan area location corresponds to the region of the lens element 140, 145 at which the field of view area is visible to the user.

The ambient light sensor 160 detects an amount of ambient light in the environment of the display system 100. In some embodiments, the ambient light sensor 160 compares the detected amount of ambient light to one or more thresholds (not shown) and communicates information regarding the amount of detected ambient light or whether the amount of detected ambient light exceeds or is less than the one or more thresholds to the controller 150. In some embodiments, the ambient light sensor 160 takes measurements of ambient light at a different frequency than the forward-facing camera captures images of the environment. For example, an ambient light reading may be taken only once for every N image frame captures from the forward-facing camera 155, where N may be an integer larger than one.

In operation, the ambient light sensor 160 communicates information regarding the amount of ambient light detected in the environment to the controller 150. The controller 150 determines a size of one or more field of view areas and location(s) of the one or more field of view areas on the lens elements 140, 145 based on the amount of ambient light detected in the environment and/or content being displayed at the display system 100. The controller 150 controls the projector 120 to scan only within a scan area that produces the field of view area and location selected by the controller 150 based on the amount of detected ambient light and/or the content displayed at the display system 100. For example, in some embodiments the controller 150 adjusts an angle of the MEMS-based scan mirror to control the scan area and location. In some embodiments, the controller 150 selects a field of view area size in inverse linear proportion to the amount of ambient light detected by the ambient light sensor 160 to maintain a comfortable contrast ratio with the ambient environment.

For example, if the ambient light sensor 160 detects a large amount of ambient light, such as in bright sunlight, the controller 150 reduces the field of view area, whereas if the ambient light sensor 160 detects a small amount of ambient light, such as in a dimly lit room, the controller 150 increases the field of view area. As the field of view area contracts, the amount of time the projector 120 spends projecting light at any given point in the scan area increases, thus increasing the brightness level perceived by the user within the scan area. By varying the field of view area and brightness level based on the detected ambient light level, the controller 150 supports daytime visibility of the display system 100 without exceeding local thermal or power constraints. For example, in a dimly lit environment, the controller 150 sets a field of view area (e.g., measured in $mm^2$) to 16×12 at 3000 nits. As the display system 100 moves to a more brightly lit environment, the controller 150 reduces the field of view to 8×12 and increases the brightness within the field of view to 6000 nits, or splits the field of view into two separate 6×6 fields of view, each having a brightness of 8000 nits.

In a dimly lit environment, the controller reduces the brightness level by expanding the field of view area. However, at some field of view area size, the projector 120 exceeds the field of view capability of the optics between the projector 120 and the user's eye (referred to as opening the MEMS angle beyond the relay optics field of view). In some embodiments, the controller 150 dynamically tunes the angle of the MEMS-based scan mirror to overdrive a fast MEMS for a semi-continuous line, thus dimming the displayed content. By overdriving the MEMS for a semi-continuous line, the controller 150 provides enhanced dynamic range in low brightness scenarios.

In some embodiments, the controller 150 varies the field of view area size, brightness level, and/or location based on content displayed at the display system 100. To illustrate, if the content includes an urgent message or visual interface for a user experience, the controller 150 controls the projector 120 to scan an area having a size and/or location at the lens elements 140, 145 adapted to enhance the user experience. Thus, for example, if the image data of the local environment captured by the forward-facing camera 155 indicates the presence of obstacles or other hazards in the local environment, the controller 150 places the field of view area in a location on the lens elements 140, 145 that does not obscure the obstacles or other hazards while still capturing a user's attention.

Figure 2:
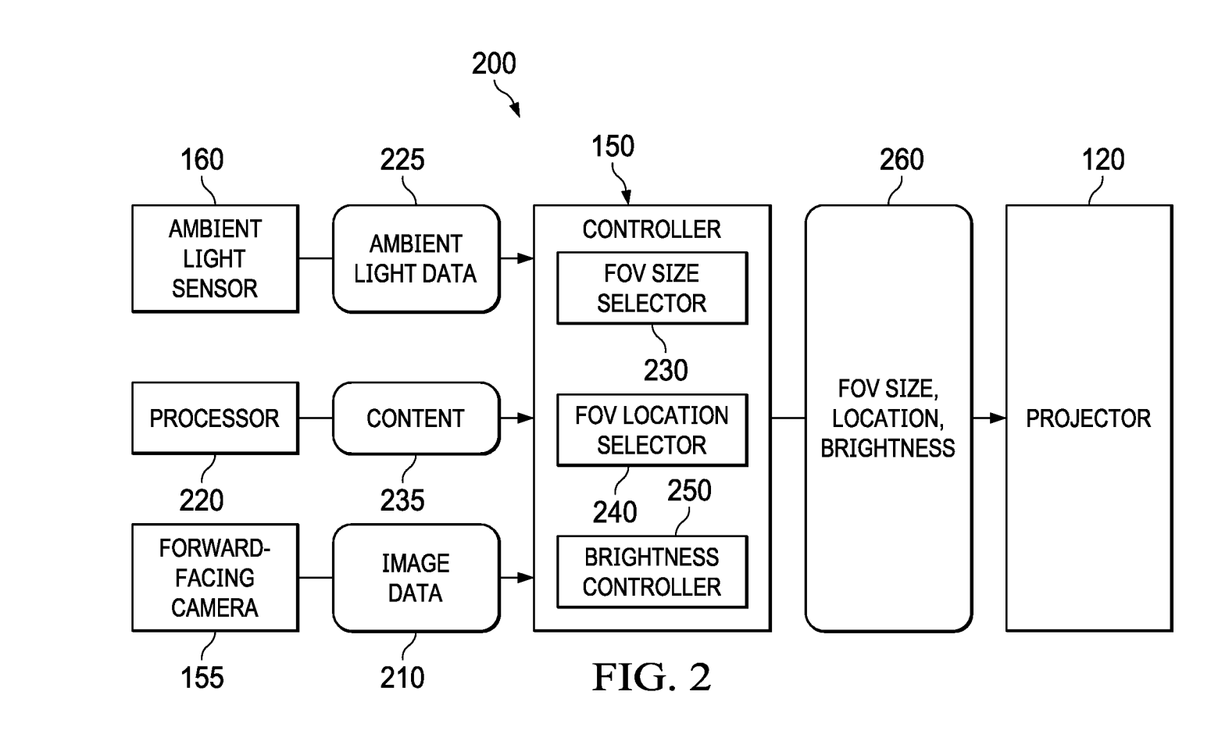
FIG. 2 is a block diagram of portion of the display system for adjusting a field of view area of the display based on detected ambient light and content displayed at the display in accordance with some embodiments.

FIG. 2 is a block diagram of a portion 200 of the display system 100 of FIG. 1 for adjusting a field of view area of the display based on detected ambient light and content displayed at the display in accordance with some embodiments. The controller 150 includes a field of view (FOV) size selector 230, a FOV location selector 240, and a brightness controller 250. The FOV size selector 230, the FOV location selector 240, and the brightness controller 250 are each implemented as hardware, firmware, software, or any combination thereof.

The controller 150 receives inputs from the ambient light sensor 160, a processor 220, and the forward-facing camera 155. The ambient light sensor 160 provides ambient light data 225 indicating an amount of ambient light detected in the environment of the display system 100 to the controller 150. The processor 220 provides content 235 for display at the display system 100 to the controller 150. The content 235 includes images for display at the display system 100. The forward-facing camera 155 provides image data 210 representing the environment of the display system 100 to the controller 150.

Based on one or more of the ambient light data 225, the content 235, and the image data 210, the FOV size selector 230 determines a size of the field of view area in which images are displayed at the lens elements 140, 145 and the brightness controller 250 determines the brightness of the displayed content within the field of view area. In some embodiments, the FOV size selector 230 selects a smaller field of view area in response to the ambient light data 225 indicating a high brightness level in the environment of the display system 100 and selects a larger field of view area in response to the ambient light data 225 indicating a low brightness level in the environment such that the size of the field of view area is inversely proportional to the level of ambient light in the environment. The brightness controller 250 varies the brightness of the displayed content in inverse proportion to the size of the field of view area such that the brightness of the content displayed at the display system 100 increases as the size of the field of view area decreases, and the brightness of the content displayed at the display system 100 decreases as the size of the field of view area increases.

The FOV size selector 230 additionally bases the determination of the size of the field of view area on the content 235. For example, if the content 235 includes an urgent notification, the FOV size selector 230 either increases the size of the field of view area so that the content 235 appears across a larger portion of the lens elements 140, 145, or decreases the size of the field of view area while the brightness controller 250 increases the brightness of the displayed content 235 so that the displayed content 235 is more likely to capture the user's attention.

The FOV location selector 240 determines one or more locations of the field of view area(s) within the user's field of view based on at least one of the content 235 and the image data 210. The FOV location selector 240 selects a location of the field of view area to allow the visual interface for an experience to be placed in a location within the user's field of view that enhances the experience. For example, in some embodiments, the FOV location selector 240 selects a location of the field of view area based at least in part on the image data 210 such that the field of view area does not obstruct the user's view of any obstacles or hazards in the user's environment.

The controller 150 controls the size, brightness, and location of the scan area of the projector 120 by providing field of view size, location, and brightness information 260 to the projector 120. Based on the information 260, the projector 120 adjusts the scan angle and duration at each point of the scanned area to project an image of the content 235 having a field of view area at a location and having a size and brightness based on the ambient light data 225, the content 235, and the image data 210.

Figure 3:
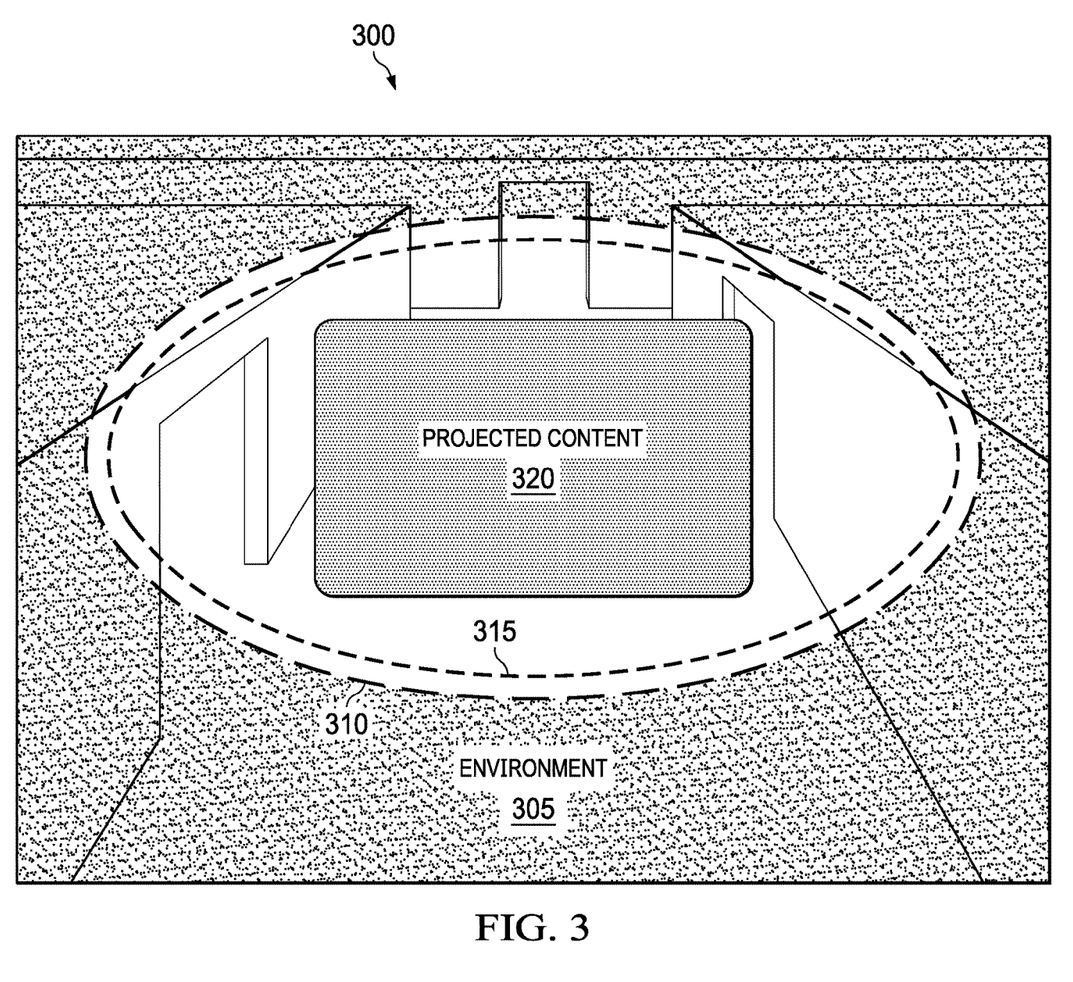
FIG. 3 is an illustration of a variable field of view of a display based on detected ambient light in accordance with some embodiments.

FIG. 3 is an illustration 300 of a variable field of view 315 of a display 310 based on detected ambient light in an environment 305 of the display system 100 in accordance with some embodiments. In the depicted example, the amount of ambient light in the environment 305 is low. The ambient light sensor 160 detects the low level of ambient light and provides the ambient light data 225 to the controller 150. The FOV size selector 230 and the brightness controller 250 determine the size and brightness of the field of view area 315 based on the ambient light data 225. Because the ambient light data 225 indicates a low level of ambient light, the controller 250 provides field of view size and brightness information 260 to the projector 120 indicating that the size of the field of view area 315 is large and the brightness of the projected content 235 is low. The projector 120 adjusts the scan angle and duration at each point of the scanned area to project an image of the projected content 320 having the field of view area 315 and a relatively low brightness.

Figure 4:
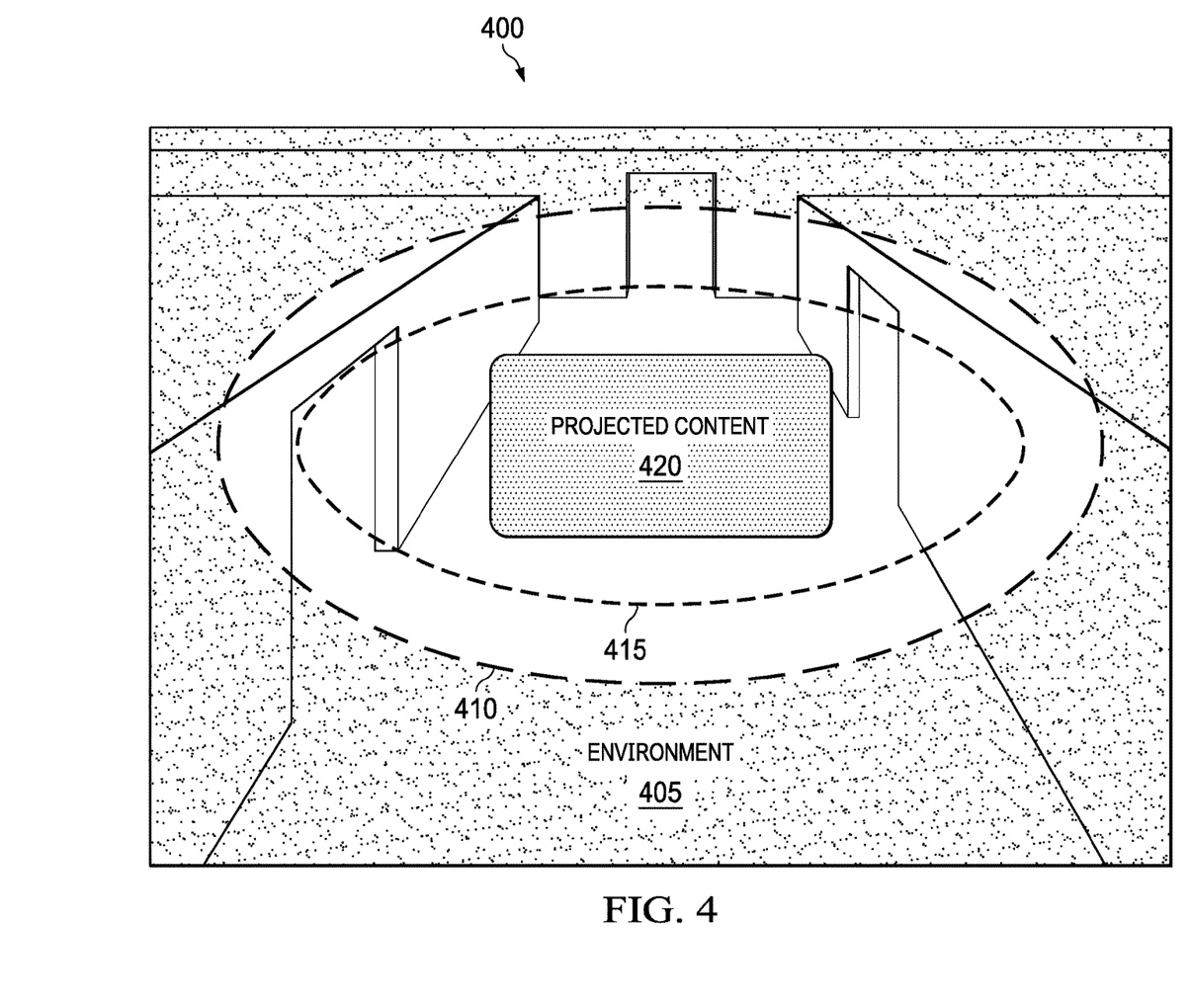
FIG. 4 is an illustration of a variable field of view of a display based on detected ambient light in accordance with some embodiments.

FIG. 4 is an illustration 400 of a variable field of view 415 of a display 410 based on detected ambient light in an environment 405 of the display system 100 in accordance with some embodiments. In the depicted example, the amount of ambient light in the environment 405 is higher than the amount of ambient light in the environment 305 of FIG. 3. The ambient light sensor 160 detects the relatively higher level of ambient light and provides the ambient light data 225 to the controller 150. The FOV size selector 230 and the brightness controller 250 determine the size and brightness of the field of view area 415 based on the ambient light data 225. Because the ambient light data 225 indicates a relatively higher level of ambient light, the controller 250 provides field of view size and brightness information 260 to the projector 120 indicating that the size of the field of view area 415 is relatively smaller than the size of the field of view area 315 of FIG. 3 and the brightness of the projected content 235 is relatively higher than the brightness of the projected content 235 of FIG. 3. The projector 120 adjusts the scan angle and duration at each point of the scanned area to project an image of the projected content 420 having the field of view area 415 and a relatively higher brightness.

Figure 5:
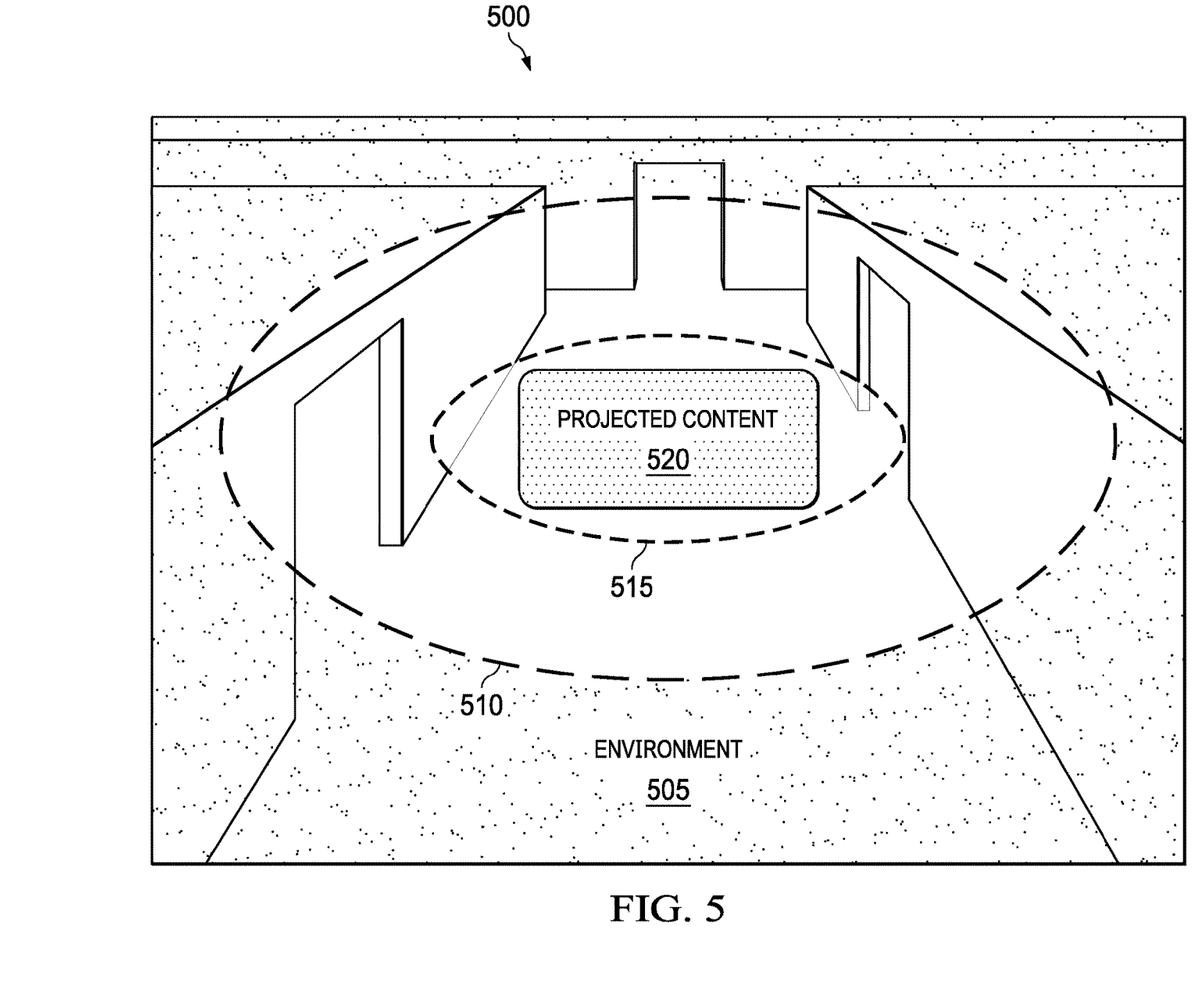
FIG. 5 is an illustration of a variable field of view of a display based on detected ambient light in accordance with some embodiments.

FIG. 5 is an illustration 500 of a variable field of view 515 of a display 510 based on detected ambient light in an environment 505 of the display system 100 in accordance with some embodiments. In the depicted example, the amount of ambient light in the environment 505 is relatively high. The ambient light sensor 160 detects the high level of ambient light and provides the ambient light data 225 to the controller 150. The FOV size selector 230 and the brightness controller 250 determine the size and brightness of the field of view area 515 based on the ambient light data 225. Because the ambient light data 225 indicates a high level of ambient light, the controller 250 provides field of view size and brightness information 260 to the projector 120 indicating that the size of the field of view area 515 is small and the brightness of the projected content 235 is high. The projector 120 adjusts the scan angle and duration at each point of the scanned area to project an image of the projected content 520 having the field of view area 515 and a relatively high brightness.

Figure 6:
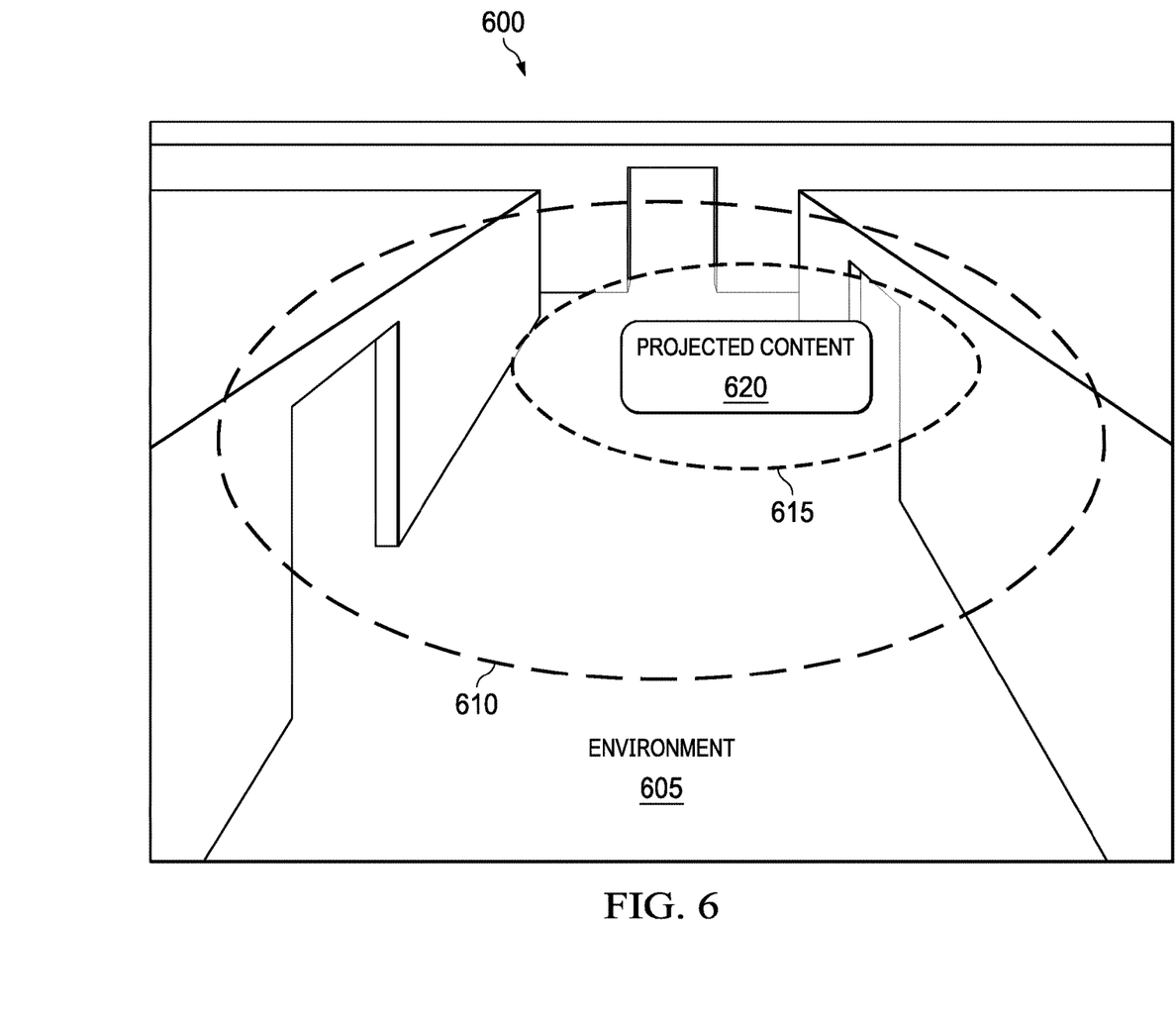
FIG. 6 is an illustration of a movable field of view of a display based on content displayed at the display in accordance with some embodiments.

FIG. 6 is an illustration 600 of a movable field of view 615 of a display 610 based on content 620 displayed at the display in accordance with some embodiments. In the depicted example, the environment 605 of the display device 100 includes a walkway with walls on either side that intersects with another walkway. The forward-facing camera 155 captures image data 210 of the environment 605 and provides the image data 210 to the controller 150. The FOV size selector 230 determines a size of the field of view area 615 and the FOV location selector 240 determines a location of the field of view area 615 to display projected content 620 based on the content 620 and the image data 210. The brightness controller 250 determines a brightness level of the field of view area 615 and the projected content 620 based on the size of the field of view area 615 and the content 620. In the illustrated example, the controller 150 selects a location and size of the field of view area 615 that does not obstruct the user's view of the intersection of the two walkways. The projector 120 adjusts the scan angle and duration at each point of the scanned area to project an image of the projected content 620 having a field of view area 615 that is sized and located within the display 610 to enhance the user's experience.

Figure 7:
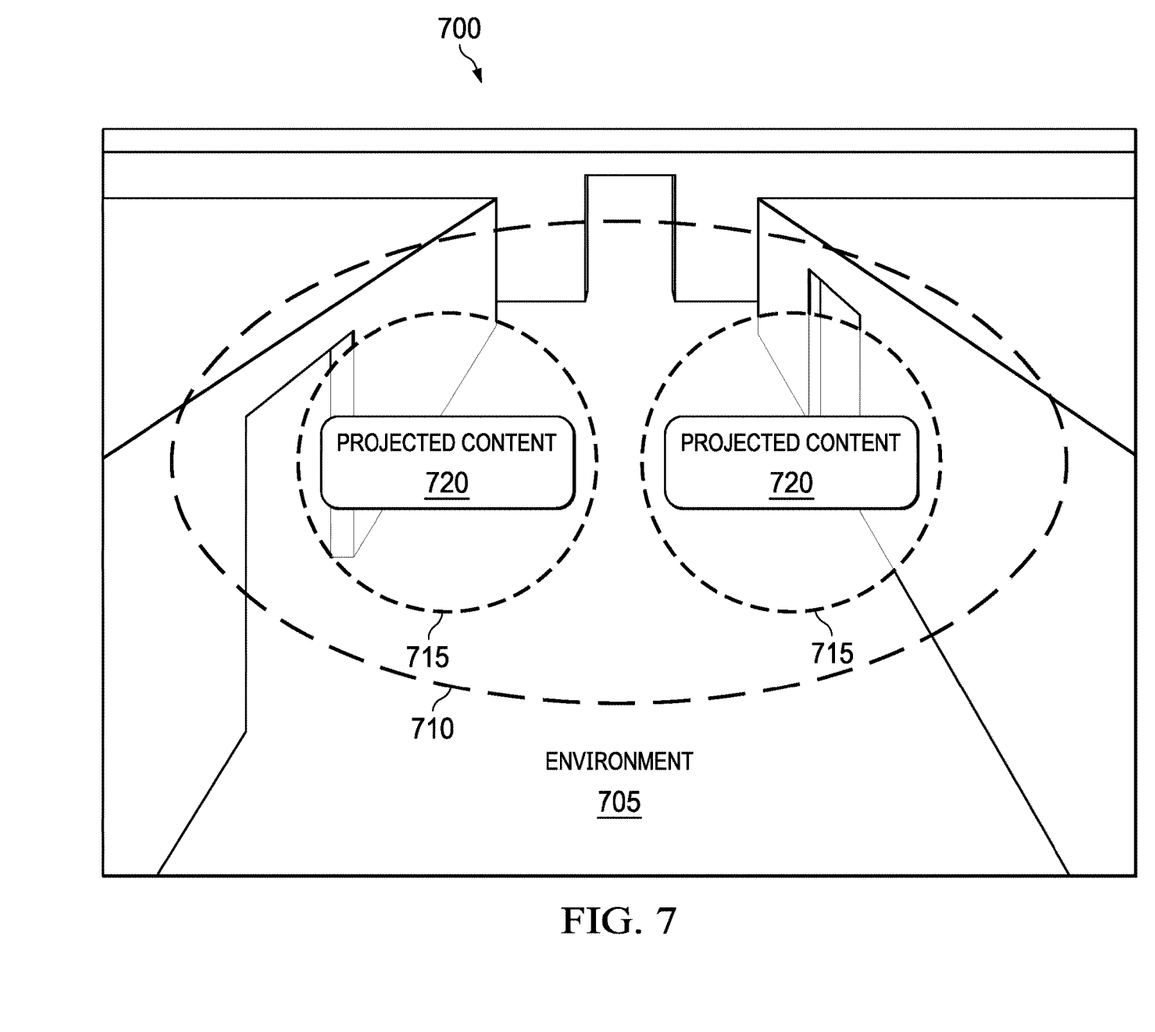
FIG. 7 is an illustration of multiple fields of view of a display based on content displayed at the display in accordance with some embodiments.

FIG. 7 is an illustration 700 of multiple fields of view 715 of a display 710 based on content 720 displayed at the display in accordance with some embodiments. In the depicted example, the environment 705 of the display device 100 includes a walkway with walls on either side that intersects with another walkway. The forward-facing camera 155 captures image data 210 of the environment 705 and provides the image data 210 to the controller 150. The FOV size selector 230 determines a number and size of the field of view areas 715 and the FOV location selector 240 determines locations of the field of view areas 715 to display projected content 720 based on the content 720 and the image data 210. The brightness controller 250 determines a brightness level of the field of view areas 715 and the projected content 720 based on the sizes of the field of view areas 715 and the content 720. In the illustrated example, the controller 150 selects locations and sizes of the field of view areas 715 that do not obstruct the user's view of the intersection of the two walkways. The projector 120 adjusts the scan angle and duration at each point of the scanned areas to project images of the projected content 720 having field of view areas 715 that are sized and located within the display 610 to enhance the user's experience.

Figure 8:
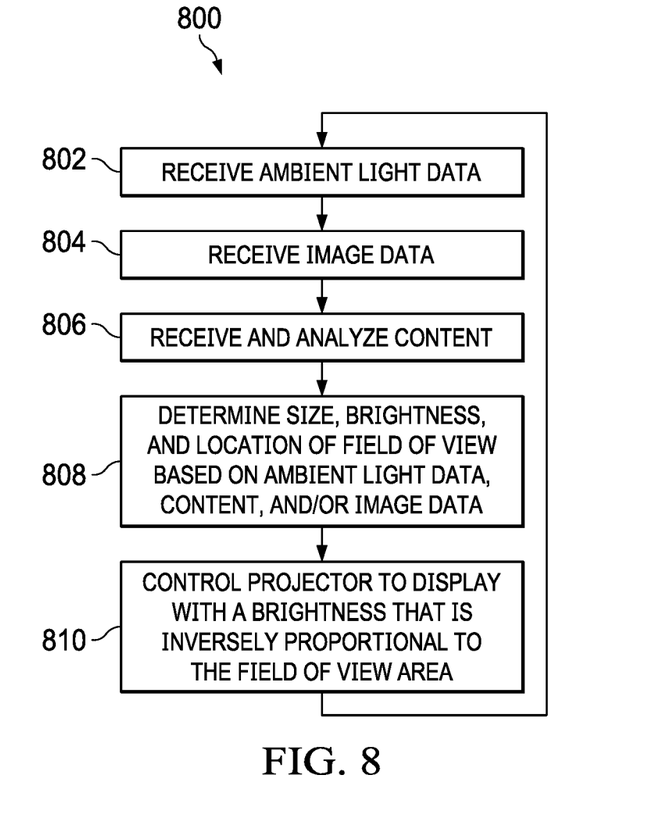
FIG. 8 is a flow diagram of a method of adjusting a location and size of a field of view area and brightness of a display based on ambient light and content displayed at the display in accordance with some embodiments.

FIG. 8 is a flow diagram of a method 800 of adjusting a location and size of a field of view area and brightness of a display based on ambient light detected in the environment, image data, and content displayed at the display in accordance with some embodiments. The method 800 is described with respect to an example implementation at the display system 100 of FIGS. 1 and 2. At block 802, the controller 150 receives ambient light data 225 from the ambient light sensor 160. At block 804, the controller 150 receives image data 210 from the forward-facing camera 155. At block 806, the controller 150 receives and analyzes content 235 for display at the display device 100.

At block 808, the FOV size selector 230 determines dimensions of the field of view area(s) based on the ambient light data 225, the content 235, and the image data 210. The FOV location selector 240 determines one or more locations to place the field of view area(s) at the display based on the image data 210 and content 235. The brightness controller 250 determines a brightness level for the projected content based on the field of view size.

At block 810, the controller 150 controls the size, brightness, and location of the scan area of the projector 120 by providing field of view size, location, and brightness information 260 to the projector 120. Based on the information 260, the projector 120 adjusts the scan angle and duration at each point of the scanned area to project an image of the content 235 having a field of view area at a location and having a size and brightness based on the ambient light data 225, the content 235, and the image data 210. The controller 150 controls the projector 120 to scan an area to project one or more field of view areas, each having a size that is inversely proportional to the amount of ambient light detected in the environment of the display system 100 and to project the content 235 with a brightness that is inversely proportional to the size of the field of view area. In some embodiments, the controller 150 controls the projector 120 to scan in an area that produces a field of view area that is located at the lens elements 140, 145 (or other display screen) in a location that enhances the user's experience based on the content 235 being displayed.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
varying a size of a field of view area, within which projected content is displayed, of a display in inverse linear proportion to an amount of ambient light in an environment of the display; and
varying a brightness level of the display based on the field of view area.

2. The method of claim 1, wherein varying the brightness level is further based on content displayed at the display.

3. The method of claim 1, further comprising:
detecting the amount of ambient light in the environment of the display.

4. The method of claim 3, further comprising:
reducing the field of view area of the display in response to detecting an increase in the amount of ambient light in the environment of the display.

5. The method of claim 4, further comprising:
moving a region of the display having a reduced field of view from a first location of the display to a second location of the display based on content displayed at the display.

6. The method of claim 4, further comprising:
splitting the reduced field of view area of the display into two or more reduced field of view areas; and
placing the two or more reduced field of view areas at two or more locations of the display based on content displayed at the display.

7. The method of claim 3, further comprising:
increasing the field of view area of the display in response to detecting a decrease in the amount of ambient light in the environment of the display.

8. The method of claim 1, wherein varying the brightness level comprises varying the brightness level in inverse proportion to the field of view area.

9. A method, comprising:
varying a brightness level of a field of view area, within which projected content is displayed, of a near eye display in inverse proportion to a size of the field of view area of the near eye display.

10. The method of claim 9, further comprising:
detecting an amount of ambient light in an environment of the near eye display; and
varying the field of view area of the near eye display based on the amount of ambient light in the environment.

11. The method of claim 10, further comprising:
reducing the field of view area of the near eye display in response to detecting an increase in the amount of ambient light in the environment of the near eye display.

12. The method of claim 11, further comprising:
moving a region of the near eye display having a reduced field of view from a first location of the near eye display to a second location of the near eye display based on content displayed at the near eye display.

13. The method of claim 11, further comprising:
splitting the reduced field of view area of the near eye display into two or more reduced field of view areas; and
placing the two or more reduced field of view areas at two or more locations of the near eye display based on content displayed at the near eye display.

14. The method of claim 9, further comprising:
selecting a location for the field of view area that does not obstruct a user's view of obstacles or hazards in a user environment.

15. The method of claim 9, wherein varying the brightness level is further based on content displayed at the near eye display.

16. A display system, comprising:
a display;
a projector having a variable scan size to vary an area of a field of view, within which projected content is displayed, of the display in inverse linear proportion to an amount of ambient light in an environment of the display; and
a controller to vary a brightness level of the field of view of the display in inverse proportion to the variable scan size.

17. The display system of claim 16, further comprising:
a sensor to detect an amount of ambient light in an environment of the display system, wherein
the projector is adapted to reduce the area of the field of view of the display and the controller is adapted to increase the brightness level of the field of view of the display in response to the sensor detecting an increase in the amount of ambient light in the environment of the display system.

18. The display system of claim 16, wherein the projector is further adapted to move a region of the display having a reduced field of view from a first location of the display to a second location of the display based on content displayed at the display.

19. The display system of claim 16, wherein the projector is further adapted to:
split a region of the display having a reduced field of view into two or more reduced field of view areas; and
place the two or more reduced field of view areas at two or more locations of the display based on content displayed at the display.

20. The display system of claim 16, wherein the controller is adapted to vary the brightness level based on content displayed at the display.

\* \* \* \* \*